United States Patent Office

3,026,304
Patented Mar. 20, 1962

3,026,304
HALOTHIOFORMYLCYANIDES AND HOMO-POLYMERS THEREOF
Stephen Proskow, Wilmington, Del., assignor to E. I. du Pont de Nemours and Company, Wilmington, Del., a corporation of Delaware
No Drawing. Filed Dec. 18, 1959, Ser. No. 860,354
18 Claims. (Cl. 260—79)

This invention relates to a new class of thioacyl cyanides, to their preparation, and to their polymers. More particularly, this invention relates to certain novel halothioformyl cyanides, to novel processes for their preparation, to polymers thereof and to useful objects obtained from said polymers.

Recently considerable attention has been given to organic compounds containing the cyano group. Furthermore, the lower atomic weight halogens, particularly fluorine, have been found to provide properties in organic compounds that are of considerable utility. Sulfur has also been found to result in versatile reactive compounds when attached to carbon. The combination of these functions in the simplest organic molecule capable of providing them has not heretofore been reported.

It is an object of this invention to provide a new class of thioacyl cyanides, novel processes for their preparation, and polymers thereof. A further object is to provide a useful and novel combination of the cyano group, sulfur, and lower weight halogen in novel thioacyl cyanides. A still further object is to provide new halothioformyl cyanides and novel processes for the preparation of these new halothioformyl cyanides. Another object is to provide novel polymers of the new halothioformyl cyanides and useful objects obtained from said polymers. Other objects will appear hereinafter.

These and other objects are accomplished by the following invention of halothioformyl cyanides having the formula

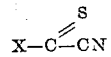

therein X is a halogen of atomic number of at least 9 and not more than 17, i.e., fluorine and chlorine. These halothioformyl cyanides can alternatively be designated cyanothioformyl halides, e.g., cyanothioformyl fluoride and cyanothioformyl chloride.

This invention also includes polymers of these novel halothioformyl cyanides, i.e., polymers of the new monomeric fluorothioformyl cyanide and chlorothioformyl cyanide, and objects, such as films, obtained from these polymers.

The monomeric halothioformyl cyanides can be obtained by the novel process of this invention which comprises contacting and reacting sulfur, at an elevated temperature, usually of at least 350° C., with a polyhalogenated acetonitrile wherein the halogens have an atomic number of 9–35 and which contains at least one halogen having an atomic number of at least 9 and not more than 17 but no more than one fluorine atom. Generally, the reaction takes place in vapor phase and the temperature of the reaction is between 350° and 900° C., preferably between 400° and 800° C. The time for reaction depends on the temperature and rate of introduction of reactants. The new fluoro- or chlorothioformyl cyanides are isolated by condensation of the gaseous products followed by fractional distillation. The halogenated acetonitriles employed in the reaction have the formula XYZCCN wherein X is chlorine or fluorine, Y is chlorine or bromine and Z is hydrogen or Y (i.e., chlorine or bromine). Examples of these polyhalogenated acetonitriles are chlorodibromoacetonitrile, bromochloroacetonitrile, dibromofluoroacetonitrile, bromochlorofluoroacetonitrile, bromofluoroacetonitrile and bromodichloroacetonitrile.

The monomeric products of this invention are also obtained when sulfur is replaced by a substantially equivalent source at high temperatures, e.g., phosphorus pentasulfide. In general, the use of sulfur is preferred since it is more economical and the reaction products have less contamination.

The new halothioformyl cyanides of this invention are highly colored liquids that are relatively stable under usual conditions, e.g., from room temperature to above the boiling points of the monomers. The new compounds react with carbon-to-carbon double bonds, e.g., with anthracene, olefins, such as 1,1-diphenylethylene, and dienes, such as 2,3-dimethylbutadiene and cyclohexadiene, as is illustrated in detail in Examples A and B. The halothioformyl cyanides also react with themselves to form polymers.

The new halothioformyl cyanides are also useful for control of noxious insects, i.e., they are active as fumigants.

Polymers of these new compounds are obtained generally by cooling. Temperatures of the order of −75° C. or below are preferred to give high yields of tough polymers. The rate of polymerization can be increased by the use of catalysts, such as dimethylformamide. Preferred stable polymers are obtained in the presence of a strong acid, particularly trifluoroacetic acid. The relatively high molecular weight polymers have an unusual combination of properties. The polymers are tough and flexible. They can be molded into shaped objects by pressure. They can be dissolved in selected solvents, such as methylene chloride, from which films or coatings and fibers can be obtained by conventional casting and spinning techniques. Films are particularly useful for wrapping and protecting other objects, e.g., from corrosive atmospheres.

The following examples further illustrate the preparation and properties of the new products of this invention.

EXAMPLE I

*Fluorothioformyl Cyanide*

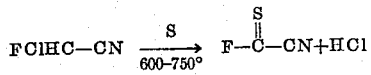

The apparatus employed for the reaction was a standard 500-ml. 3-necked flask adapted with a thermocouple well and two vertical side-arm tubes about 30 cm. long and 2.5 cm. in diameter. One tube was equipped with a dropping funnel and nitrogen inlet. The other tube, which was constructed from the heat-resistant glass known commercially as "Vycor," was packed for a length of 10 cm. with quartz rings and jacketed its full length with a flexible band heater. Two traps attached horizontally to the "Vycor" tube, and a drying tube, completed the assembly.

The flask was charged with about 400 g. of filtered sulfur and a slow stream of nitrogen was flushed through the system while the flask and "Vycor" tube were heated to 400° and 650° C., respectively. The terminal trap was then cooled with solid carbon dioxide-acetone and the nitrogen flow-rate adjusted to ca. 150 cc./min. A solution of 25 g. of fluorochloroacetonitrile in 40 ml. of carbon disulfide was then added dropwise over a period of one hour. During the addition, the temperature of the sulfur was maintained at 400–445° and the "Vycor" tube at 600–650°.

The bulk of unreacted sulfur accumulated in the first trap. In the cooled trap there was obtained 50 ml. of a deep red-orange liquid. An aliquot of this liquid on titration at −80° with 2,3-dimethylbutadiene (see below) established that the yield of fluorothioformyl cyanide was 33%. For further purification, the crude product was fractionated by distillation at 123 mm. Hg pressure (B.P. ca. −1°) and the resulting distillate chromatographed at room temperature using a copper column containing 20% Dow-Corning silicone fluid No. 200 on ground firebrick.

The purified product was a red-orange liquid that did not undergo change when stored at room temperature in a sealed glass vial for a month, but samples stored at −80° tended to polymerize spontaneously. This product was identified as fluorothioformyl cyanide as follows. Mass spectrometric analysis indicated a molecular formula of $C_2FNS$; infrared spectrographic analysis indicated the presence of $C≡N$ (4.5μ) C—F and C=S (8–9μ region); and nuclear magnetic resonance showed a single fluorine resonance line at +6280 c.p.s. relative to trifluoroacetic acid at zero. The n-m-r spectrum was obtained by means of a Varian High Resolution nuclear magnetic resonance spectrometer and associated electromagnet operating at 40 mc. and approximately 10,000 gauss. Positive shifts are at a lower field relative to the reference. The product was also characterized by elemental analysis of its anthracene derivative (see below).

EXAMPLE II

Fluorothioformyl cyanide was obtained from fluorodichloroacetonitrile and sulfur under the general conditions of Example I.

EXAMPLE III

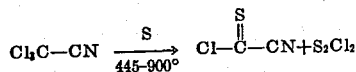

A 2.5-cm. diameter tube of "Vycor" glass, packed for a length of 15 cm. with quartz rings, was connected to a trap cooled by solid carbon dioxide-acetone. The tube was heated to 750° over a length of 30 cm. A solution of 21.6 g. of trichloroacetonitrile and 32 g. of filtered sulfur in 250 ml. of carbon disulfide was then added dropwise over a period of 1.5 hours in the presence of a stream of nitrogen of flow-rate ca. 175 cc./min.

The deep purple condensate was vacuum-distilled from the unreacted sulfur into a second cooled trap and an aliquot titrated at −80° with 2,3-dimethylbutadiene. This indicated that the crude yield of chlorothioformyl cyanide was ca. 25%. A fractional distillation under reduced pressure followed by vapor phase chromatography at 95° with a column of Dow-Corning silicone fluid No. 200 on ground firebrick gave the product (B.P. near 85°) as a mixture with unreacted trichloroacetonitrile.

The product was identified by mass spectrographic analysis that indicated a molecular formula of $C_2ClNS$ and by elemental analysis of its 1,3-cyclohexadiene derivative (see below). The chlorothioformyl cyanide was relatively stable since it did not undergo change when kept in a sealed glass vial several hours at room temperature.

EXAMPLE IV

When the general procedure of Example III was repeated except that trichloroacetonitrile was passed through refluxing sulfur vapor at 445° C., chlorothioformyl cyanide was obtained.

EXAMPLE V

When dichloroacetonitrile was employed in place of trichloroacetonitrile in the procedures of Examples III and IV, chlorothioformyl cyanide also resulted.

EXAMPLE VI

When trichloroacetonitrile was passed into refluxing phosphorus pentasulfide at 514° C., chlorothioformyl cyanide was obtained.

EXAMPLE VII

Poly(fluorothioformyl Cyanide)

A 10-ml. sample of monomeric fluorothioformyl cyanide in the form of the red-orange condensate obtained by fractional distillation in Example I was cooled to −80° and one drop of dimethylformamide was added. Most of the color faded after 0.5 hour and a white mass of the poly(fluorothioformyl cyanide) separated. After treating the mixture in the cold with trifluoroacetic acid, the polymer was separated, washed with trifluoroacetic acid, and dried in vacuo. A tough, flexible film was pressed from the poly(fluorothioformyl cyanide) at 80° and 3,000 lb./sq. in. Similar polymers of fluorothioformyl cyanide were obtained when diethyl ether or trimethylphosphite were used in place of dimethylformamide, or when the pure fluorothioformyl cyanide polymerized spontaneously in glass vessels at low temperatures.

EXAMPLE VIII

Poly(chlorothioformyl Cyanide)

The polymer of chlorothioformyl cyanide formed as a white insoluble solid under conditions similar to those employed in Example VII with dimethylformamide as the polymerization initiator. The chlorothioformyl cyanide monomer polymerized spontaneously in glass at low temperatures to give a purple-tinged, tough white mass. Higher purity polymer was obtained when trifluoroacetic acid was present.

Reaction of chloro- and fluorothioformyl cyanide with unsaturated compounds is illustrated by the following:

EXAMPLE A

12-Cyano-12-Fluoro-11-Thia-9,10-Ethanoanthracene

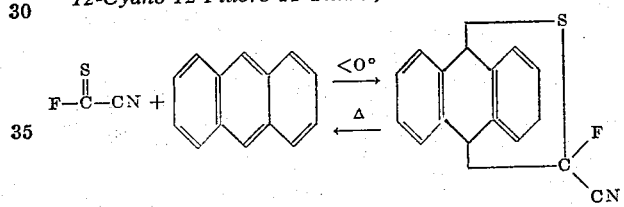

A sample of monomeric fluorothioformyl cyanide in the form of the red-orange condensate obtained by fractional distillation in Example I was cooled in a trap with solid carbon dioxide-acetone and a solution of approximately one equivalent of anthracene in carbon disulfide was added. The trap was then allowed to warm gradually to room temperature during which time decolorization of the fluorothioformyl cyanide was complete. Evaporation of the solution to dryness followed by two recrystallizations of the residue from benzene gave the pure 12-cyano-12-fluoro-11-thia-9,10-ethanoanthracene as colorless crystals, M.P. 139–142°. The infrared spectrum was in agreement with this structure.

*Analysis.*—Calcd. for $C_{16}H_{10}FNS$: C, 71.90; H, 3.77; F, 7.11; N, 5.24; S, 11.99. Found: C, 71.45; H, 3.75; F, 6.77; N, 5.57; S, 12.30.

Fluorothioformyl cyanide reacts instantaneously at −78° with 2,3-dimethylbutadiene.

When a sample of the anthracene adduct of fluorothioformyl cyanide was heated at reduced pressures in a flask connected to a trap cooled in solid carbon dioxide-acetone, the adduct decomposed to regenerate fluorothioformyl cyanide (collected in the trap as a red-orange liquid) and anthracene. The regenerated cyanide gave the same anthracene adduct, M.P. 139–142°, when treated again with anthracene.

EXAMPLE B

3-Chloro-3-Cyano-2-Thiabicyclo[2.2.2]-5-Octene

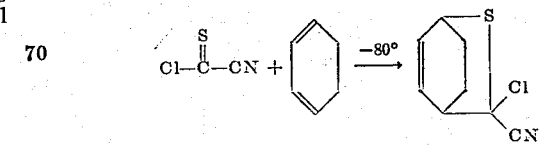

A 5-ml. portion of the deep purple condensate obtained by fractional distillation in Example III was distilled in vacuo into 5 ml. of 1,3-cyclohexadiene contained in a trap cooled with solid carbon dioxide-acetone. The chlorothioformyl cyanide monomer was instantaneously decolorized on contact with the diene. After pumping out the volatile materials at room temperature, the residual liquid (2 ml.) was crystallized twice at low temperatures by means of ether-pentane, and then recrystallized once from pentane. The pure, colorless product had M.P. 71–74° and expected infrared spectrum for 3-chloro-3-cyano-2-thiabicyclo[2.2.2]-5-octene.

*Analysis.*—Calcd. for $C_8H_8ClNS$: C, 51.75; H, 4.34; Cl, 19.09; S, 17.27. Found: C, 51.68; H, 4.54; Cl, 18.77; S, 17.46.

Chlorothioformyl cyanide also reacts at low temperatures with cyclopentadiene, 2,3-dimethylbutadiene and 1,1-diphenylethylene.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A halothioformyl cyanide having the formula

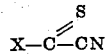

where X is halogen of atomic number of at least 9 and not more than 17.

2. Fluorothioformyl cyanide having the formula

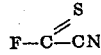

3. Chlorothioformyl cyanide having the formula

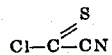

4. A homopolymer of a halothioformyl cyanide selected from the group consisting of fluorothioformyl cyanide and chlorothioformyl cyanide.

5. A homopolymer of fluorothioformyl cyanide.

6. A homopolymer of chlorothioformyl cyanide.

7. A film of a homopolymer of a halothioformyl cyanide selected from the group consisting of fluorothioformyl cyanide and chlorothioformyl cyanide.

8. A film of a homopolymer of fluorothioformyl cyanide.

9. A film of a homopolymer of chlorothioformyl cyanide.

10. Process which comprises heating and contacting a reactant selected from the group consisting of sulfur and phosphorus pentasulfide, at a temperature of at least 350° C., with a polyhalogenated acetonitrile of formula XYZCCN, where X is selected from the group consisting of chlorine and fluorine, Y is selected from the group consisting of chlorine and bromine, and Z is selected from the group consisting of hydrogen, bromine and chlorine, and obtaining as reaction product a halothioformyl cyanide.

11. Process which comprises heating and contacting phosphorus pentasulfide, at a temperature of at least 350° C., with a polyhalogenated acetonitrile of formula XYZCCN, where X is selected from the group consisting of chlorine and fluorine, Y is selected from the group consisting of chlorine and bromine, and Z is selected from the group consisting of hydrogen, bromine and chlorine, and obtaining as reaction product a halothioformyl cyanide.

12. Process which comprises heating and contacting phosphorus pentasulfide, at a temperature within the range of 350° C. to 900° C., with trichloroacetonitrile, and obtaining as reaction product chlorothioformyl cyanide.

13. Process which comprises heating and contacting sulfur, at a temperature of at least 350° C., with a polyhalogenated acetonitrile of formula XYZCCN, where X is selected from the group consisting of chlorine and fluorine, Y is selected from the group consisting of chlorine and bromine, and Z is selected from the group consisting of hydrogen, bromine and chlorine, and obtaining as reaction product a halothioformyl cyanide.

14. Process as set forth in claim 13 wherein sulfur is heated and contacted, at a temperature within the range of 400° C. to 800° C. with said polyhalogenated acetonitrile.

15. Process which comprises heating and contacting sulfur, at a temperature within the range of 350° C. to 900° C., with fluorochloroacetonitrile, and obtaining as reaction product fluorothioformyl cyanide.

16. Process which comprises heating and contacting sulfur, at a temperature within the range of 350° C. to 900° C., with fluorodichloroacetonitrile, and obtaining as reaction product fluorothioformyl cyanide.

17. Process which comprises heating and contacting sulfur, at a temperature within the range of 350° C. to 900° C., with dichloroacetonitrile, and obtaining as reaction product chlorothioformyl cyanide.

18. Process which comprises heating and contacting sulfur, at a temperature within the range of 350° C. to 900° C., with trichloroacetonitrile, and obtaining as reaction product chlorothioformyl cyanide.

References Cited in the file of this patent

FOREIGN PATENTS 815,274     Great Britain _____ June 24, 1959